(12) United States Patent
Fontan Tarodo

(10) Patent No.: US 6,233,166 B1
(45) Date of Patent: May 15, 2001

(54) UNINTERRUPTED POWER SUPPLY SYSTEM

(75) Inventor: Antonio Fontan Tarodo, Madrid (ES)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/453,415

(22) Filed: Dec. 3, 1999

(30) Foreign Application Priority Data

Dec. 23, 1998 (ES) ..................................................... 9802679

(51) Int. Cl.⁷ ...................................................... H02M 1/10
(52) U.S. Cl. ............................................................ 363/142
(58) Field of Search ............................... 363/17, 98, 132, 363/142; 307/2, 52, 60, 69, 72, 75

(56) References Cited

U.S. PATENT DOCUMENTS

| | | | | |
|---|---|---|---|---|
| 4,780,801 | * | 10/1988 | Gill et al. ................................ | 363/25 |
| 4,827,151 | * | 5/1989 | Okado ..................................... | 307/66 |
| 5,010,469 | * | 4/1991 | Bobry ..................................... | 363/37 |
| 5,896,282 | * | 4/1999 | Wu ......................................... | 363/96 |

* cited by examiner

*Primary Examiner*—Matthew Nguyen
(74) *Attorney, Agent, or Firm*—Sughrue, Mion, Zinn, Macpeak & Seas, PLLC

(57) ABSTRACT

Uninterrupted power supply system being connected to a power source through input terminals (11-1 and 11-2) and transforming the electric power received into a level of voltage and current appropriate for feeding a telecommunications equipment through output terminals (12-1 and 12-2). A recognising means (14) examines the electrical characteristics of the received power and, as a function of the results of the analysis, configures a determined conversion path between the input terminals (11-1 and 11-2) and the output terminals (12-1 and 12-2); to which purpose it generates a set of control signals (S1, S2, S3 and S4) which, respectively, activate a set of switching means (15-1, 15-2, 15-3 and 15-4).

12 Claims, 1 Drawing Sheet

UNINTERRUPTED POWER SUPPLY SYSTEM

OBJECT OF THE INVENTION

The present invention relates to a power supply system to feed electric power continuously to electrical and/or electronic equipment, being of special but not exclusive application in a telecommunications system.

The power supply system is able of receiving power from any source and configuring a conversion path for producing at its output a voltage and current appropriate for the equipment that it is feeding.

STATE OF THE ART

Telecommunication systems are presently evolving very rapidly towards telecommunication systems in which radio signals are totally or partly replacing copper wire in the connection between the subscriber and the switching system. Thus, access systems that employ wireless and/or cordless, cellular, etc. technologies appear.

All these systems have the special feature of locating close to the subscribers, remote units containing, for example, some equipment related with the switching system and, also, equipment related with the radio system such as transmitters and receivers, all of which must be fed with electric power to operate.

As a result, the remote units incorporate power supply systems that serve to provide the electric power to enable the telecommunications part to set up communications between the subscribers and a public switched telephone network (PSTN), for example.

These telecommunications systems are very attractive for operators, either new or already having a telecommunications network, since they do not require an exhaustive planning study to be carried out in order to implement their deployment in a geographical area where it is desired to provide telephone services, for which reason they can be put into service very quickly and easily.

Nevertheless, the operators and, consequently, the suppliers of telecommunication systems, encounter the impediment of not knowing the electrical characteristics of the electric power source present in each of the locations selected for each of the remote units spread over the geographical area where the telecommunications system is to be implemented.

Thus, the need arises to employ a power supply system able of being connected to electric power sources having differing electrical characteristics, and to produce from the received electric power a voltage and current appropriate for the electrical characteristics of the communications equipment with which each remote unit is fitted, without the personnel installing the telecommunication system having to perform any manual intervention and, in addition, the deployment designers of the telecommunications network need not reject a possible site for a remote unit due to the electrical characteristics of the power supply existing at said location. As a result, the site selection shall be made on the grounds of the suitability or not for the telecommunications equipment included in the remote unit.

CHARACTERIZATION OF THE INVENTION

To overcome the problems mentioned above, an uninterrupted power supply system is proposed which offers dimensional and electrical operating characteristics suitable for being mounted together with telecommunications equipment, forming a remote unit, which is installed in the proximity of subscribers to a telecommunications system.

The uninterrupted power supply system of the invention receives electric power from an electric supply source, so that a recognising means, included in said power supply system, examines the received power in order to determine its electrical characteristics and, as a function of the results of the analysis performed, routes the power received over a determined power conversion path, obtaining at the end of said path electric power in a suitable form to be fed to the telecommunications equipment included in each remote unit.

Thus, the uninterrupted power supply system can be connected to a broad range of electric power sources, for which reason its installation is fast and straightforward, the only requirement being to connect the power supply system directly to the electric power source.

As a result, the installation of the different remote units of the telecommunications system is practically independent of the electrical characteristics of the electric power source that shall supply electric power to each remote unit, respectively.

The uninterrupted power supply system offers a high overall efficiency, low cost and compact size, as well as satisfying all international standards relative to the harmonics content of the input current, for example EN61000-3-2.

BRIEF DESCRIPTION OF THE FIGURES

A more detailed explanation of the invention is provided in the following description, based on the figures attached, in which.

DESCRIPTION OF THE INVENTION

Figure 1:
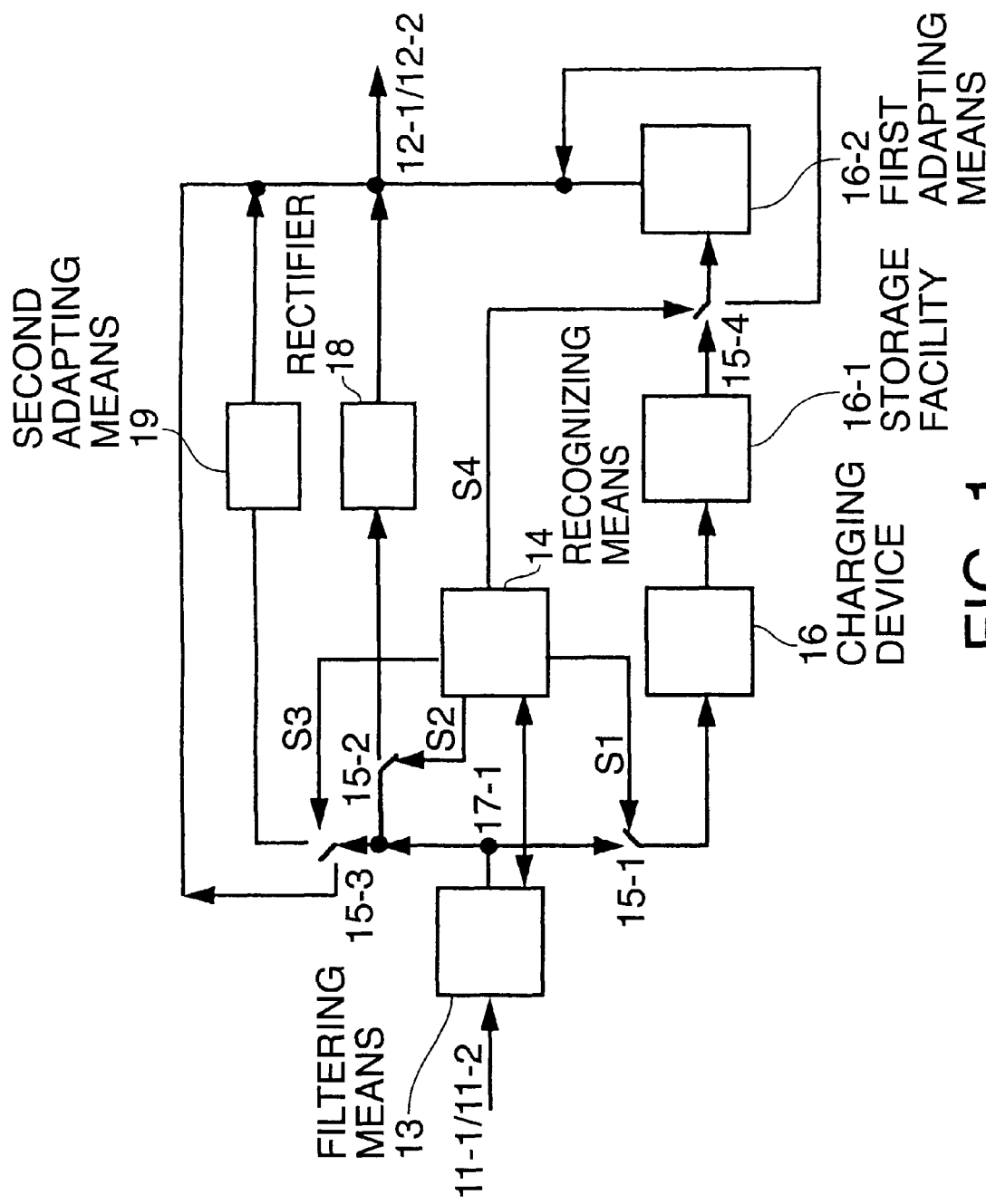
FIG. 1 shows a block diagram of a preferred embodiment of an uninterrupted power supply system according to the invention.

FIG. 1 shows a block diagram of the uninterrupted power supply system which receives electric power from an electric supply source, such as an AC mains line and/or a DC supply unit, through input terminals 11-1 and 11-2, and produces across its output terminals 12-1 and 12-2 a voltage and current appropriate for a load.

The electric power received through the input terminals 11-1 and 11-2, is passed through a filtering means 13 for filtering out the harmonics contained in the received current and the electromagnetic interference conducted over the power lines connected to the terminals 11-1 and 11-2.

The filtered power, before being applied to a determined conversion path, is examined by a recognising means in order to determine its electrical characteristics and, on a basis of the results of the analysis, to route the filtered power to the appropriate conversion path, for completing the power transformation process and obtaining across the output terminals 12-1 and 12-2 the voltage and current required by the telecommunications equipment.

The uninterrupted power supply system for performing the power transformation process comprises at least a first conversion path, for example for direct current (DC), and a second conversion path, for example for alternating current (AC).

The power supply system also comprises a third conversion path able of storing power and supplying it to the load, in the event of an outage of the power source.

The third conversion path receives power coming from the output of the filtering means 13, when a first switching means 15-1 is off, said first switching means being operated (off and on) by means of a first control signal S1 generated by the recognising means 14.

An end of the first switching means 15-1 is connected, by means of conductors, to a first node 17-1 located in the output of the filtering means 13; and its other end is connected, by means of conductors, to a charging device 16.

The power that flows through the first switching means 15-1 is adapted for storing in a storage facility 16-1, such as a battery, by means of the charging device 16, what is known in the state of the art.

When an outage in the power source arises, the energy stored in the battery 16-1 before being fed to the load, can be adapted by boosting it in a first adapting means 16-2, as is a boost switched power converter, for example, said boost power converter 16-2 not being described as it is known in the state of the art.

This connection is made under the control of the recognising means 14, which produces a fourth control signal S4 for activating a fourth switching means 15-4, so that the battery 16-1 and the first adapting means 16-2 are directly connected to each other. An end of the fourth switching device 15-4 is connected to the output of the battery 16-1; another of its ends is connected to the input of the first adapting means 16-2.

In the event of there being no need to adapt the voltage of the battery 16-1, the output of the battery is connected directly to the output terminals 12-1 and 12-2, through another end of the fourth switching means. To this purpose, the fourth control signal S4 produced by the recognising means 14, acts on the fourth switching means 154 in order to implement said connection.

The second AC conversion path receives power when a second switching means 15-2 is turned on, as the electric power source supplies AC power. The recognising means 14 produces a second control signal S2 for operating the second switching means 15-2.

An end of the second switching means 15-2 is connected, via a number of conductors, to the first node 17-1, and its other end is connected, via a number of conductors, to a rectifying means 18, for example a diode bridge, for rectifying the received power, producing at its output a rectified voltage that is applied directly to the load over the output terminals 12-1 and 12-2.

The first DC conversion path receives power from the first node 17-1 when the voltage source provides DC power, this connection being established by means of a third switching means 15-3, activated by a third control signal S3 produced by the recognising means 14.

The third switching device 15-3 is connected, via conductors, to the first node 17-1; another of its ends is connected, via conductors, to a second adapting means 19, so that in the event of adapting being required before supplying to the load, said adapting process is performed by the second adapting means 19, for example a boost converter. The output of this second adapter 19 is connected to the output terminals 12-1 and 12-2.

However, when the characteristics of the power supplied by the DC source are appropriate for the characteristics required by the load, the recognising means 14 activates the third switching means 15-3, so that a direct connection is established between the first node 17-1 and the output terminals 12-1 and 12-2, which are connected to another end of the third switching means 15-3.

As a result, the recognising means 14, by means of the third control signal S3, activates the third switching means 15-3 so that said connection is implemented.

The recognising means 14 includes a control logic for analyzing the electrical characteristics of the source and comparing them with the electrical characteristics of the load and, based on the results of the analysis performed, producing the different control signals S1, S2, S3 and S4 for setting up the most suitable conversion path for implementing the conversion process.

The electrical characteristics of the load are inserted into the recognising means 14 during the process of equipping each remote unit, for example by means of a computer that is connected to a communications port (not shown) incorporated in the recognising means 14.

What is claimed is:

1. An uninterrpted power supply system coupled to an electric power source through input terminals, for transforming received electric power to a prescribed voltage and current for supplying a telecommunications equipment over output terminals, said power supply comprising a recognising circuit determining electrical characteristics of said received electric power and, in accordance with results obtained from said determination, configuring a conversion path between said input terminals and said output terminals; wherein said recognising circuit produces a first control signal for activating a first switch, a second control signal for activating a second switch, a third control signal for activating a third switch, and a fourth control signal for activating a fourth switch.

2. A power supply system according to claim 1, wherein a conversion path for direct current is provided by said third switch having an input connected to a node; a first output connected directly to said output terminals; and a second output connected to an adapter adapting the received power before said received power is supplied to said telecommunications equipment via said output terminals.

3. A power supply system according to claim 1, wherein a conversion path for alternating current is provided by said second switch having an input connected to a node, an output connected to a rectifier for rectifying said received power, with an output of said rectifier connected to said output terminals.

4. A power supply system according to claim 1, wherein a conversion path for direct current is provided by:
    said first switch having an input connected to a node; an output connected to a charging device for charging a storage facility which stores energy, and
    said fourth switch having an input connected to an output of said storage facility, a first output directly connected to an output of said storage facility; and a second output connected to an adapter for adapting the received power before said received power is supplied to said telecommunications equipment via said output terminals.

5. A power supply system according to claim 4, wherein said storage facility is a battery.

6. A power supply system according to claim 4, wherein said adapter is a switched power converter of a boost type.

7. A power supply system according to claim 2, wherein said adapter is a switched power converter of a boost type.

8. An uninterrupted power supply system coupled to a power source through input terminals for transforming received power to a prescribed voltage and current and outputting said transformed power to output terminals, comprising:
    a recognising circuit determining electrical characteristics of the received power and, in accordance with said determination, configuring a conversion path between said input terminals and said output terminals, wherein, said recognising circuit produces a first control signal for activating a first switch, a second control signal for activating a second switch, a third control signal for activating a third switch, and a fourth control signal for activating a fourth switch, and said conversion path is for direct current and is provided by said third switch having an input connected to a node, a first output connected to said output terminals and a second output connected to an adapter for adapting the received power before said received power is supplied to said output terminals.

9. The power supply system of claim 8, wherein said adapter is a switched power converter of a boost type.

10. An uninterrupted power supply system coupled to a power source through input terminals, for transforming a received power to a prescribed voltage and current and outputting said received power to output terminals, comprising:

a recognising circuit for determining electrical characteristics of the received power and, in accordance with said determination, configuring a conversion path between said input terminals and said output terminals, wherein, said recognising circuit is adapted for producing a first control signal for activating a first switching means, a second control signal for activating a second switching means, a third control signal for activating a third switching means, and a fourth control signal for activating a fourth switching means, said first switch has an input connected to a first node, an output connected to a charging device for charging a storage facility that stores energy, and said fourth switch has an input connected to an output of said storage facility, a first output connected to said output terminals and a second end connected to an adapter for adapting the received power before said received power is supplied to said output terminals.

11. The power supply system of claim 10, wherein said storage facility is a battery.

12. The power supply system of claim 10, wherein said adapter is a switched power converter of a boost type.

\* \* \* \* \*